United States Patent
Kim et al.

(10) Patent No.: US 11,275,182 B2
(45) Date of Patent: Mar. 15, 2022

(54) SYSTEMS AND METHODS FOR SCINTILLATORS HAVING REFLECTIVE INSERTS

(71) Applicant: GE Precision Healthcare LLC, Wauwatosa, WI (US)

(72) Inventors: Changlyong Kim, Brookfield, WI (US); Gary McBroom, Dousman, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 0 days.

(21) Appl. No.: 16/855,727

(22) Filed: Apr. 22, 2020

(65) Prior Publication Data

US 2021/0333416 A1    Oct. 28, 2021

(51) Int. Cl.
*G01T 1/20* (2006.01)

(52) U.S. Cl.
CPC .......... *G01T 1/2002* (2013.01); *G01T 1/2018* (2013.01)

(58) Field of Classification Search
None
See application file for complete search history.

(56) References Cited

U.S. PATENT DOCUMENTS

| | | |
|---|---|---|
| 4,733,083 A | 3/1988 | Wong |
| 4,743,764 A | 5/1988 | Casey et al. |
| 4,749,863 A | 6/1988 | Casey et al. |
| 5,091,650 A | 2/1992 | Uchida et al. |
| 5,210,420 A | 5/1993 | Hartz et al. |
| 5,227,633 A | 7/1993 | Ryuo et al. |
| 5,227,634 A | 7/1993 | Ryuo et al. |
| 5,300,782 A | 4/1994 | Johnston et al. |
| 5,319,204 A | 6/1994 | Wong |
| 5,866,908 A | 2/1999 | Novak |
| 6,717,150 B2 | 4/2004 | Hoffman |
| 7,088,901 B2 | 8/2006 | Kim et al. |

(Continued)

FOREIGN PATENT DOCUMENTS

| | | |
|---|---|---|
| WO | 2003081280 A3 | 10/2003 |
| WO | 2014181232 A1 | 11/2014 |

OTHER PUBLICATIONS

International Search Report and Written Opinion for corresponding PCT application No. PCT/US2016/048579 dated Feb. 2, 2017; 11 pages.

*Primary Examiner* — Edwin C Gunberg
(74) *Attorney, Agent, or Firm* — The Small Patent Law Group LLC; Dean D. Small (57) ABSTRACT

A scintillator crystal assembly includes a crystal array and an open reflective insert. The crystal array is configured to receive rays emitted by an object to be imaged and to emit light energy responsive to the received rays. The crystal array comprising plural crystals arranged in rows. Each crystal includes a reception surface configured to receive the rays emitted by the object to be imaged, an emission surface configured to emit the light energy responsive to the received rays, and plural sides extending from the emission surface that are aligned with sides of adjacent crystals in the crystal array. The open reflective insert is disposed between adjacent rows of the crystal array, and includes at least one reflective portion and at least one opening. The at least one reflective portion defines an area and the at least one opening is positioned within the area.

14 Claims, 8 Drawing Sheets

(56) References Cited

U.S. PATENT DOCUMENTS

| | | |
|---|---|---|
| 8,718,226 B2 | 5/2014 | Jorristma et al. |
| 9,012,854 B2 | 4/2015 | Wieczorek et al. |
| 9,182,506 B2 | 11/2015 | Kim et al. |
| 9,279,892 B2 | 3/2016 | Kim et al. |
| 9,864,073 B1 | 1/2018 | Kim |
| 2009/0134334 A1* | 5/2009 | Nelson ................ G01T 1/2008 250/361 R |
| 2010/0270463 A1 | 10/2010 | Lee et al. |
| 2011/0042571 A1 | 2/2011 | Perna |
| 2011/0056618 A1* | 3/2011 | Tonami ................ G01T 1/2018 156/242 |
| 2013/0299707 A1 | 11/2013 | Levin et al. |
| 2014/0084170 A1 | 3/2014 | Wieczorek et al. |
| 2015/0219771 A1 | 8/2015 | Kim et al. |
| 2016/0170040 A1 | 6/2016 | Kim |

\* cited by examiner

SYSTEMS AND METHODS FOR SCINTILLATORS HAVING REFLECTIVE INSERTS

BACKGROUND

The subject matter disclosed herein relates generally to imaging systems and techniques, and more particularly to crystals used in scintillators.

In certain types of imaging devices, such as positron emission tomography (PET) scanners, arrays of detector elements are used to detect radiation emanating from the patient. In a PET scanner, for example, arrays of scintillator crystals may be used to detect annihilation photons which are generated inside the patient. The annihilation photons are produced when a positron emitted from a radiopharmaceutical injected into the patient collides with an electron causing an annihilation event. The scintillator crystals receive the annihilation photons and generate photons in response to the annihilation photons, with the photons emitted to a photosensor configured to convert the light energy from the photons to electrical energy used to reconstruct an image.

Spatial resolution of a PET detector is strongly influenced by the crystal size. Generally, the smaller the crystal size is, the better spatial resolution can be achieved as far as identifying each crystal impacted by a gamma ray and separating an impacted crystal from its neighboring crystals. Improved spatial resolution may provide the ability to identify smaller lesions in PET and lead to an early detection of tumors. However, the ability to identify impacted crystals not only depends on the crystal size but also several other factors, for example, light output from crystals, the light sharing scheme among the crystals and photosensors, the layout of photosensors, the size of photosensors, lightguide design (if a lightguide is present), readout electronics scheme, and electronics noise.

BRIEF DESCRIPTION

In accordance with various embodiments, a scintillator crystal assembly is provided that includes a crystal array and an open reflective insert. The crystal array is configured to receive rays emitted by an object to be imaged and to emit light energy responsive to the received rays. The crystal array comprising plural crystals arranged in rows. Each crystal includes a reception surface configured to receive the rays emitted by the object to be imaged, an emission surface configured to emit the light energy responsive to the received rays, and plural sides extending from the emission surface that are aligned with sides of adjacent crystals in the crystal array. The open reflective insert is disposed between adjacent rows of the crystal array, and includes at least one reflective portion and at least one opening. The at least one reflective portion defines an area and the at least one opening is positioned within the area.

In accordance with various embodiments, a detector system for imaging an object is provided that includes a scintillator block, an open reflective insert, and a photosensor. The scintillator block is configured to receive rays from an object to be imaged and to emit light energy responsive to the received rays. The scintillator block includes a scintillator crystal array configured to receive rays emitted by the object and to emit light energy responsive to the received rays. The scintillator crystal array includes plural crystals, each crystal comprising a reception surface configured to receive the rays emitted by the object to be imaged, an emission surface configured to emit the light energy responsive to the received rays, and plural sides extending from the emission surface, wherein the sides are aligned with sides of adjacent crystals in the crystal array. The open reflective insert is disposed between adjacent rows of the crystal array, and includes at least one reflective portion and at least one opening. The at least one reflective portion defines an area, with the at least one opening positioned within the area. The photosensor is configured to receive the light energy emitted from the scintillator crystal array.

In accordance with various embodiments, a method for providing a scintillator for imaging an object is provided. The method includes providing an open reflective insert including at least one reflective portion and at least one opening. The at least one reflective portion defining an area and the at least one opening is positioned within the area. The method also includes assembling the open reflective insert within a crystal array with plural crystals to form a scintillator crystal assembly. The open reflective insert is disposed between adjacent rows of crystals of the array.

DETAILED DESCRIPTION

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "image" or similar terminology is not intended to exclude embodiments in which data representing an image is generated, but a viewable image is not. Therefore, as used herein the term "image" broadly refers to both viewable images and data representing a viewable image. However, certain embodiments generate, or are configured to generate, at least one viewable image.

Various embodiments provide crystal arrays for scintillators for imaging systems, including open reflective inserts. For example, some embodiments provide reflective inserts with a gated or fenced configuration having spaced posts aligned with crystals of the array. Various embodiments provide reduction in the number of parts in a complex detector, simplifying assembly and reducing assembly cost. Various embodiments use variable post widths to provide improved spacing to improve separation peaks in a floodmap of a detector. Various embodiments help use only a minimum or necessary amount of reflective material, reducing absorption of light.

It may be noted that, for a given scintillator, photosensor layout, and electronic readout scheme, the achievable minimum size of the crystal is limited by the light sharing among crystals that may be controlled by crystal surface finish, optical glue between crystals and light reflector insert between crystals. As the crystal size gets smaller, the light sharing scheme may become more complex. For example, U.S. Pat. No. 9,864,073 (Systems and Methods for Controlling Optical Coupling Between Scintillator Crystals) discusses the use of an optical adhesive film with various shapes to control the light sharing between crystals. As another example, U.S. Pat. No. 9,279,892, "Systems and Methods for Scintillators Having Polished and Roughened Surfaces," discusses the use of roughened surfaces to enhance timing resolution for PET detectors. While both optical adhesive film and surface roughness increases light sharing, polished surfaces and reflective films could be utilized to reduce light sharing.

Well separated crystal locations in a floodmap are desirable for a PET detector. Without good crystal identification, it may not be possible to achieve the potential spatial resolution entitled by the crystal size. The design of a crystal block may start with different crystal surfaces, which may be relatively simple depending on the variation of surface finish necessary. For example, a polished surface may act like a reflector, and a roughened surface may act to scatter light. However, when crystal size gets smaller, optical adhesive and/or reflective films may be necessary in addition to different crystal surface finishes, and may suffer from poor flexibility and/or difficulty of assembly. Various embodiments provide novel systems and/or methods to simplify the detector assembly with respect to the handling of multiple small reflective films.

A technical effect of at least some embodiments provides improved detector performance. For example, a technical effect of at least some embodiments includes improved control of light shared between crystals and/or light output of a scintillator crystal array. The improved control of shared light in various embodiments provides improved crystal separation in the floodmap that improves the quality of line-of-responses and so enables improved achievement of spatial resolution permitted by the crystal size. As another example, a technical effect of at least some embodiments provides improved timing resolution of a scintillator crystal array.

Figure 1:
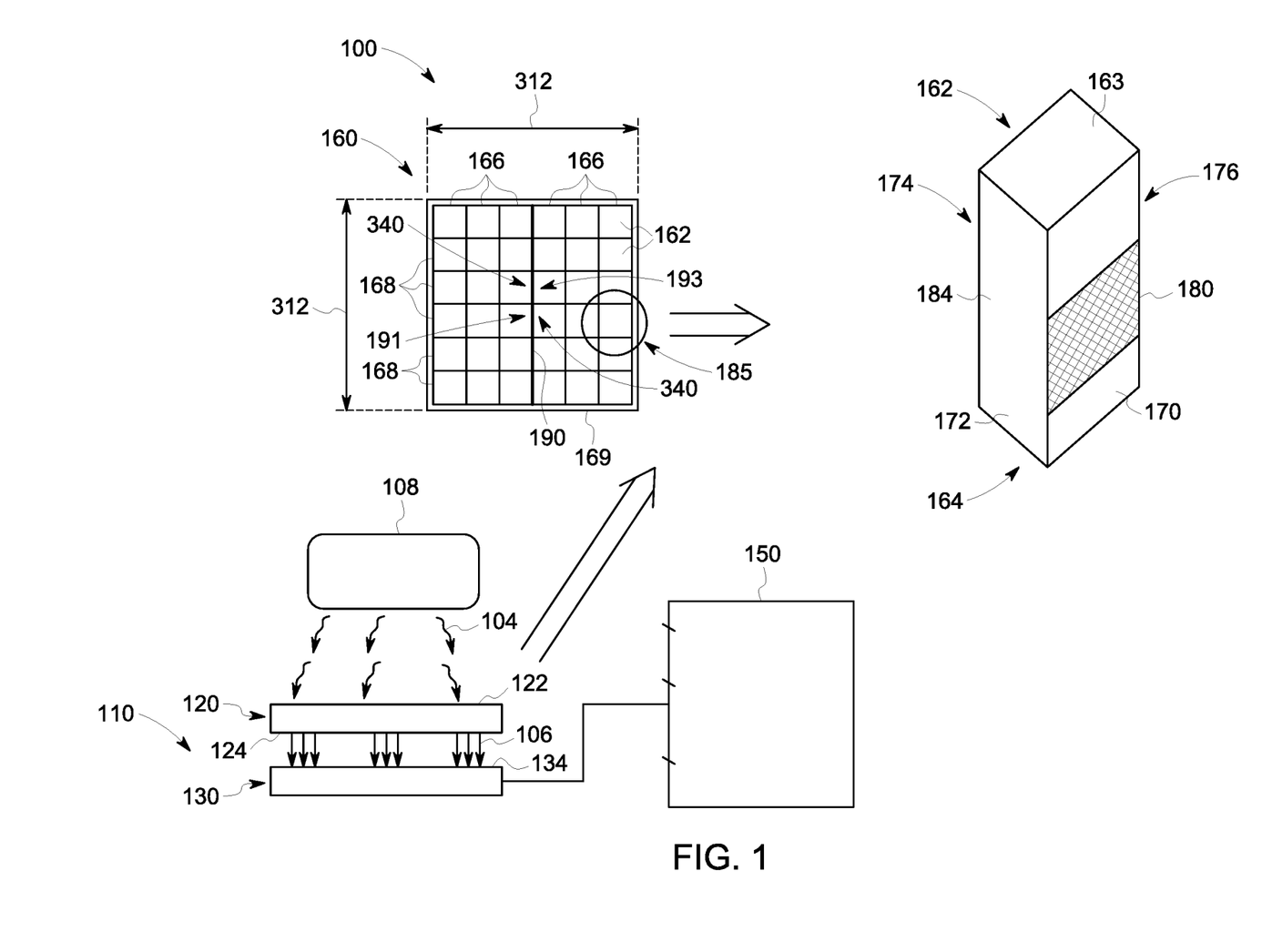
FIG. 1 is a schematic diagram of an imaging system in accordance with various embodiments.

FIG. 1 provides a schematic diagram of an imaging system 100 in accordance with various embodiments. The imaging system 100 includes a detector 110 and a processing unit 150. The detector 110 includes a scintillator block 120 and a photosensor 130. In the illustrated embodiment, the scintillator block 120 and the photosensor 130 form a positron emission tomography (PET) detector. However, in other embodiments, the scintillator block 120 and the photosensor 130 may additionally or alternatively be used with one or more other imaging modalities, such as computed tomography (CT), for example. It may be noted that one or more the various components or units of FIG. 1, although depicted as physically separate units or components, may in various embodiments be configured as more than one component or unit and/or be combined with another component or unit. For example, the photosensor 130 and one or more aspects of the processing unit 150 may be configured as a single unit.

Generally, in the illustrated embodiment, the imaging system 100 may be used to provide an image (e.g., a PET image) of the object 108. The object 108, for example, may be a portion of a human or animal patient. In the illustrated embodiment, the object 108 emits annihilation photons 104 due to the introduction of a radiopharmaceutical. The annihilation photons 104 are sensed by the detector 110 and used to reconstruct an image. The emitted ray may be a gamma ray produced by a transition in the nucleus of an atom.

The depicted scintillator block 120 produces light photons 106 responsive to the impact of annihilation photons 104 upon the scintillator. The light photons 106 from the scintillator block 120 impact the photosensor 130. The photosensor 130 is configured to produce electric charge responsive to the impingement of light photons 106 from the scintillator upon a light reception surface 134 of the photosensor 130. The electric charge generated responsive to the reception of light may be measured (e.g., by the processing unit 150), and used to determine the amount of light impinging upon a given portion of the photosensor 130, such as one or more pixels. The amount of light impacting the various portions of the photosensor 130 may be used to identify the location where the annihilation photon interacted in the scintillator block 120. The total amount of light impacting the photosensor 130 may be used to determine the energy of the annihilation photon.

The scintillator block 120 is configured to receive the annihilation photons 104 emitted by the object 108 and to emit light photons 106 responsive to reception of the annihilation photons 104. It may be noted that a large number of light photons may be produced for each annihilation photon that impacts the scintillator block 120. It may also be noted that in the schematic depiction of FIG. 1 the scintillator block 120 is shown at a distance from the photosensor 130; however, the scintillator block 120 and photosensor 130 may be joined in various embodiments. Further, in some embodiments, a light guide may be provided. The light guide may be configured as a transparent interface between the scintillator block 120 (e.g., crystals of the scintillator block 120) and the photosensor 130, for example where the surface areas of the scintillator block 120 and the photosensor 130 are not the same. In the illustrated embodiment, the scintillator block 120 includes a reception surface 122 and an emission surface 124. In the illustrated example, the reception surface 122 is oriented toward the object 108, and the emission surface 124 is oriented toward the photosensor 130, such that the reception surface 122 and the emission surface 124 are located opposite each other. In other embodiments, the reception surface 122 and emission surface 124 may be oriented differently with respect to each other. Generally, in various embodiments, a ray (e.g., annihilation photon) impacts the reception surface 122, and enters the scintillator block 120. After traveling a distance in the scintillator block 120, the annihilation photon interacts with the scintillator 120 producing a large number of light photons. A portion of these light photons 106 are emitted from a corresponding portion of the emission surface 124 to the photosensor 130. It may be noted, as also discussed below, that the emission surface and reception surface of the scintillator block 120 may be oriented in different directions in various alternate embodiments (e.g., both the emission surface and the reception surface may be oriented upwards toward the object being imaged in some embodiments).

The photosensor 130 is configured to receive the light photons 106 from the scintillator block 120, and convert received light photons to electric charge. The light energy may be converted and collected by specific portions of the photosensor 130 that receive the energy (e.g., pixels), and the collected charge used to provide a measure of the rays received by the detector on a per pixel basis.

A top view of the scintillator block 120 is seen in the top center of FIG. 1. The depicted scintillator includes an array 160 of individual crystals 162. The scintillator block 120 includes a reflector member 169. The reflector member 169 covers all the surfaces of the array 160 excluding the emission surface 124, and is configured to reflect light generated by the crystals 162 directed from the sides of the array 160 back into the array 160. Thus, the light generated from the array 160 may be prevented from escaping from the sides of the array 160, increasing the proportion of the light created by the scintillation event that is emitted from the emission surface 124 toward the photosensor 130. In the illustrated embodiment, the scintillator block 120 is shown having a single array 160 for ease of illustration; however, it may be noted that plural arrays 160 may be assembled together to form the scintillator block 120 (with each array 160 surrounded by a corresponding reflector member 169 disposed around the sides of the array 160), for example to form a panel of the scintillator block 120. The depicted array 160 of crystals 162 is arranged in vertical rows 166 (arranged vertically as seen in FIG. 1) and horizontal rows 168 (arranged horizontally as seen in FIG. 1). In various embodiments, different numbers of vertical rows and/or horizontal rows may be employed, or different arrangements of crystals may be employed.

As seen in the perspective view of an individual crystal 162 on the right hand side of FIG. 1, the depicted individual crystal 162 includes an upper surface 163 and a lower surface 164. The upper surface 163 and the lower surface 164 are disposed opposite of each other and are separated by sides. In the illustrated embodiment, the upper surface 163 is configured to form part of the reception surface 122 of the scintillator block 120, and the lower surface 164 is configured to form part of the emission surface 124 of the scintillator block 120. Thus, in the illustrated embodiment, the upper surface 163 is configured as a reception surface and the lower surface 164 is configured as an emission surface. It may be noted that other arrangements may be utilized in alternate embodiments. For example, a single surface (e.g., the upper surface 163) may be configured as both a reception surface and an emission surface. As another example, one or more of the sides extending between an upper and lower surface may be configured as a reception and/or emission surface. It should also be noted that the use of "upper" and "lower" surfaces herein is used for clarity and ease of description and illustration of opposed surfaces separated by sides, and is not intended to imply any specific orientation requirements. For example, a particular crystal or array may be rotated or otherwise position so that an "upper" surface points downward, or to a side.

The crystal 162 is configured to scintillate, or produce light energy responsive to rays (e.g., annihilation photons) received by the crystal 162. In the illustrated embodiment, the crystal 162 has four sides extending between the upper surface 163 and the lower surface 164, defining a generally rectangular cross-section. The crystal 162 includes a first side 170, a second side 172, a third side 174 (the third side 174 is disposed opposite the first side 170), and a fourth side 176 (the fourth side 176 is disposed opposite the second side 172). The crystal 162 may be made, as one example, of Lutetium Yttrium Silicate (LYSO), or, as another example, of Bismuth Germanate (BGO; $Bi_4Ge_3O_{12}$).

In various embodiments, at least one of the sides 170, 172, 174, 176 includes a roughened side surface, and at least one other side includes a smooth or polished side surface. Thus, in various embodiments, one side of a crystal in a scintillator crystal array has a different surface finish than a different side of the crystal, where one surface finish is relatively rougher, and the other surface finish is relatively smoother. Additional discussion and details regarding the use of polished and roughened surfaces may be found in U.S. Pat. No.

9,279,892, "Systems and Methods for Scintillators Having Polished and Roughened Surfaces," issued Mar. 8, 2016, the entire content of which is incorporated by reference herein.

In the illustrated embodiment, first side 170 includes a roughened side surface 180, and the second side 172 includes a polished side surface 184. In FIG. 1, the roughened side surface 180 is depicted as covering only a portion of the first side 170. For example, the roughened side surface 180 may cover about one half of the first side 170. In other embodiments, the roughened side surface 180 may cover a larger or smaller proportion of the first side 170. For example, in some embodiments, the roughened side surface 180 may cover substantially the entire first side 170. As used herein, in some embodiments, a surface finish may be understood to substantially cover an entire side if the surface finish covers 95% or more of the side. In the illustrated embodiment, substantially the entire surface of the second side 172 is polished, and is covered by the polished side surface 184. Additionally or alternatively, the third side 174 and the fourth side 176 may be polished (not shown in FIG. 1). It may be noted that other cross-sections, such as polygons other than rectangles or triangles, may be utilized in other embodiments.

As discussed in U.S. Pat. No. 9,279,892, roughened surfaces may be used to reduce trapped scintillation light through Lambertian reflection, and, accordingly, to enhance the light collection in the photosensor. The increased light collection improves both energy and timing resolution. Polished and roughened surfaces may also used to achieve a floodmap that shows a good separation between crystals. Roughened surfaces spread relatively more light to neighboring crystals and polished surfaces spread relatively less. The amount of roughened surface 180 may be adjusted to achieve a proper light sharing. It may be noted that, in some applications, polished or roughened surfaces may not alone proved a desired amount of control of light sharing. As another example, U.S. Pat. No. 9,864,073 discusses enhancing light sharing using optical adhesive beyond the limit that can be achieved by roughened surfaces. It may further be noted that to reduce the light sharing below the limit that can be achieved by a polished surface, an optical reflective film may be used.

Figure 2A:
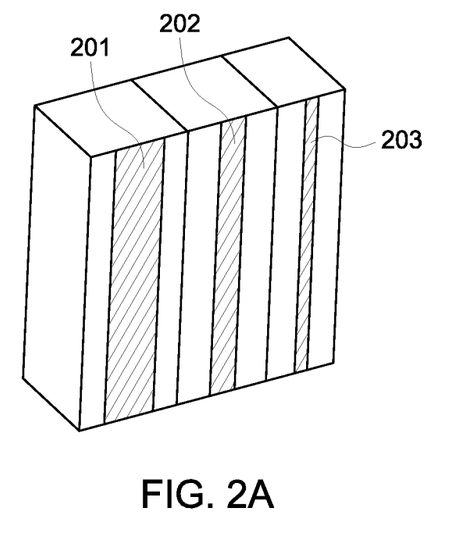
FIG. 2a provides a schematic depiction of a crystal block using reflective strips.

Depending on the size of the reflective film between crystals, the amount of light sharing may be controlled. FIG. 2a shows three different widths of ESR reflective film strips (a wide strip 201, a medium strip 202, and a narrow strip 203) placed on crystal surfaces. The depicted ESR strips are shown as having the same width from the top to bottom of a crystal to provide a uniform light sharing that is independent of location of a gamma ray impact location. Generally, the wider the ESR strip is, the less light sharing there will be with neighboring crystals. If the width of an ESR strip is same to the width of the crystal, there is no light sharing. If the width of an ESR film is too narrow, the film may be difficult to position or place accurately. An open reflective insert (e.g., open reflective insert 190 discussed herein) may be utilized to increase rigidity and so improve both stacking of crystals and handling of strips during assembly.

Such strips may provide for control of light sharing; however, if many of these reflective film strips are necessary for a block assembly, the assembly may become complex and costly since each piece is separately attached to each crystal while trying to maintain a good alignment. In various embodiments, ESR portions are attached with one or more crossbars (see, e.g., FIG. 3 and FIGS. 4a and 4b), thereby reducing the number of pieces, and the reflective portions may be inserted between the rows and columns of crystals to simplify the assembly. The number of crossbars may be one, or two, or more, depending on the desired rigidity. It may be noted that a sufficiently small width of such a crossbar may not have a noticeable effect in the amount of light sharing. The location of the crossbars in various embodiments may be at the top and/or bottom of a crystal block, or as another example, may be in the middle. In various embodiments, the locations of the crossbars are selected so that various reflective portions do not interfere with each other to make a loose egg crate for crystals.

Further, in the illustrated embodiment, the imaging system 100 (e.g., the detector 110) includes an open reflective insert 190. The open reflective insert 190, along with the crystal array 160 and/or the scintillator block 120 may be understood as forming or defining a scintillator crystal assembly 185. Generally, the open reflective insert 190 is utilized to control an amount of light transferred between adjacent crystals 162 of the crystal array 160.

Generally, the open reflective insert 190 is disposed between adjacent rows of the crystal array 160. For example, in the example depicted in FIG. 1, the open reflective insert 190 is disposed between a pair of adjacent vertical rows 166. As another example, the open reflective insert 190 may be disposed between a pair of adjacent horizontal rows 168. Further, more than one open reflective insert 190 may be utilized in various embodiments (e.g., two or more open reflective inserts 190 disposed between corresponding pairs of adjacent vertical rows 166 and/or two or more open reflective inserts 190 disposed between corresponding pairs of adjacent horizontal rows 168. Further, it may be noted that in various embodiments, a number of identical open reflective inserts 190 may be used and/or a number of differently configured open reflective inserts 190 may be used.

Figure 2B:
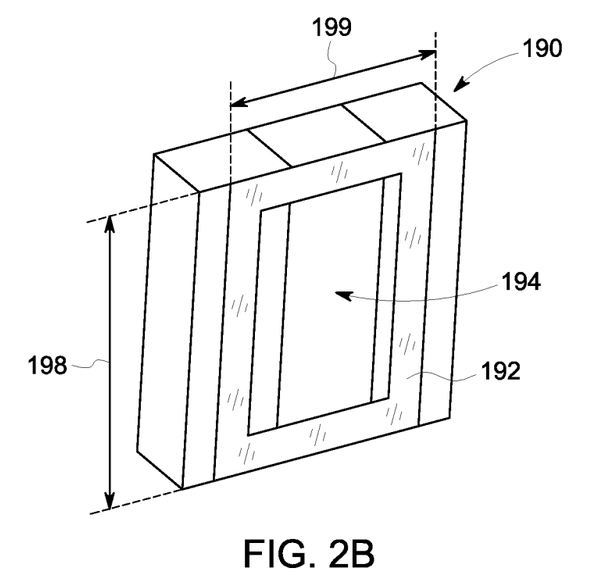
FIG. 2b provides a schematic depiction of an example open reflective insert in accordance with various embodiments.

FIG. 2 provides a schematic depiction of an example open reflective insert 190. Generally, open reflective inserts 190 that may be used in connection with the imaging system 100 include at least one reflective portion and at least one opening. Reflective portions as used herein are portions of the open reflective insert 190 that reflect at least some light between adjacent crystals (e.g., to re-direct light back into a source crystal from which the light would otherwise be transmitted to an adjacent crystal), and openings as used herein do not inhibit light passing between adjacent crystals. It may be noted that the open reflective insert 190 in various embodiments is monolithic. For example, in various embodiments, reflective portions may be made of an enhanced specular reflector (ESR) film, with the openings defined by open spaces within the film where material has been removed (e.g., via a die-cut process).

The example open reflective insert 190 of FIG. 2 includes a reflective portion 192 and at least one opening 194. The reflective portion 192 defines an area 196, with the at least one opening 194 positioned within the area. For example, the example open reflective insert 190 defines a rectangular area 196 with a portion of reflective material removed within the area 196 to form the opening 194. The open reflective insert 190 depicted in FIG. 2 has a height 198 that exceeds the height of an individual crystal 162, and a length 199 that exceeds the length of an individual crystal. Accordingly, the reflective portion 192 of the open reflective insert 190 covers portions of more than one crystal 162. Use of such open reflective inserts improves alignment of reflective portions and openings with respect to a crystal array, provides consistency of assembly, and provides simplified assembly relative to the use of individual entirely solid strips or pieces of reflective material. In various embodiments, both first side 191 and second side 193 of the open reflective insert have reflective portions. (See FIG. 1.)

Figure 3:
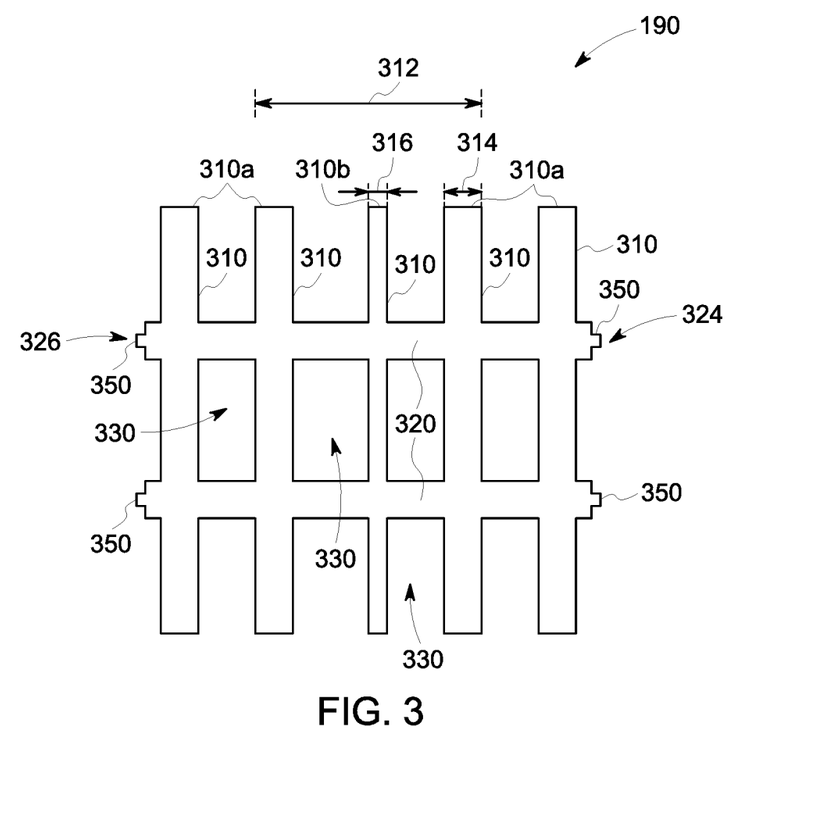
FIG. 3 provides a front view of an example open reflective insert that includes spaced posts in accordance with various embodiments.
Figure 4A:
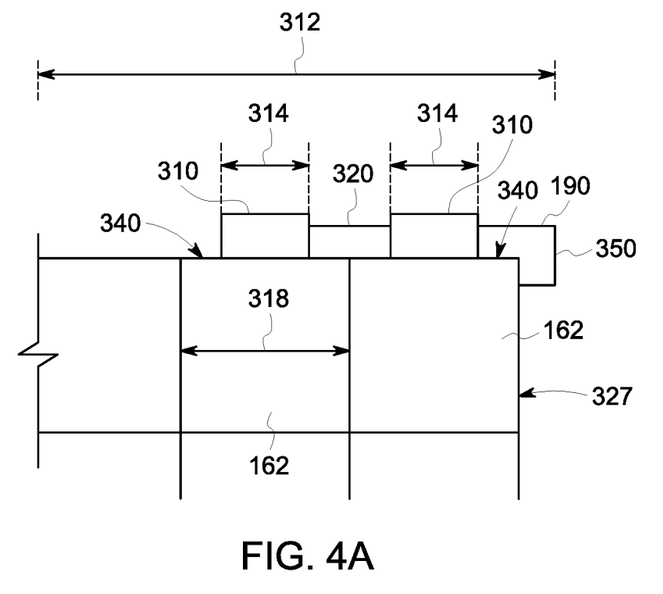
FIG. 4a provides a top view of the example open reflective insert of FIG. 3.
Figure 4B:
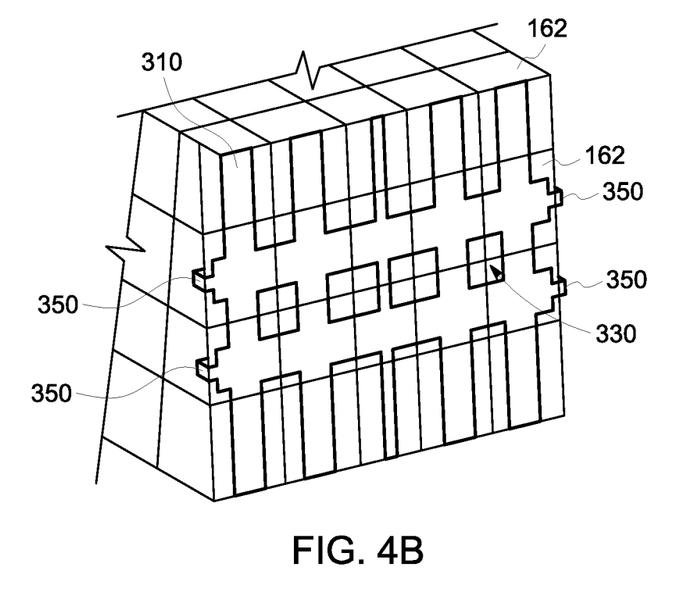
FIG. 4b provides a perspective view of the example open reflective insert of FIG. 3.

In various embodiments, the open reflective insert 190 may have multiple openings, such as in a gated or fenced arrangement. FIG. 3 provides a front view of an example open reflective insert 190 that includes spaced posts, and FIG. 4 provides a top view of the example open reflective insert 190 of FIG. 3. Generally, the open reflective insert 190 depicted in FIG. 3 includes spaced posts 310 that extend along a lateral dimension 312 (e.g., length or width). Each post 310 is configured to be aligned with a side of corresponding crystal 162 (see, e.g., FIG. 4), and is configured to control light shared between the corresponding crystal and a crystal that is adjacent to the corresponding crystal. (Crystals are only shown on one side of the open reflective insert 190 in FIG. 4 for clarity and ease of illustration.) The example open reflective insert 190 of FIG. 3 includes 2 cross-bars 320 that are spaced from each other and join the posts, and extend laterally across the crystal array 160. Other numbers of cross-bars may be used in alternate embodiments. The number, size, and location of cross-bars may be selected, for example, to facilitate assembly. It may be noted that relatively small or narrow cross-bars may not have noticeable effect on the amount of light sharing. Use of gated or fenced configurations such as the example open reflective insert of FIG. 3 in various embodiments provides for improved ease of assembly and alignment relative to individually placing inserts relative to crystals. Such configurations help reduces the number of parts and simplify the assembly process.

For the example open reflective insert 190 of FIG. 3, the posts 310 and cross-bars 320 define reflective portions, and the openings 330 between the posts 310 and cross-bars 320 define openings. As seen in FIG. 3, both the posts 310 and cross-bars 320 have a rectangular shape. Other shapes may be used in other embodiments. The open reflective insert 190 of FIG. 3 may be formed, for example, by die-cutting a reflective film, such as an ESR film. In some embodiments, the widths or other dimensions of the posts 310 and cross-bars 320 may be selected to provide a desired amount of reflectivity. In other embodiments, the widths or other dimension of the posts 310 may be selected to provide a desired amount of reflectivity, and the widths or other dimensions of the cross-bar 320 may be selected to provide enough rigidity to facilitate assembly of a crystal assembly including the open reflective insert 190 while minimizing impact on light transmission or reflection.

As discussed above, the crystals 162 may have roughened sides and polished sides. In various examples, the posts 310 (and/or cross-bars 320, and/or other reflective portions) are disposed between polished sides 340 of the crystals 162. (See FIGS. 1 and 4.) Use of reflective surfaces in connection with polished sides in various embodiments provides for improved control of the amount of light that is reflected back into a crystal and the amount of light that is transmitted to an adjacent crystal.

The example open reflective insert 190 of FIG. 3 includes posts having different widths. As seen in FIG. 3, the example open reflective insert 190 includes a first group of posts 310a that have a first width 314, and a second post 310b that has a second width 316 that is different from the first width 314. In the illustrated example, the second width 316 is less than the first width 314. It may be noted that the second post 310b may be part of a group of such second posts 310b. (See, e.g., FIG. 5.) Further, in various embodiments, at least some of the posts 310 have a post width 314, 316 that is smaller than a crystal width 318 (see FIG. 4) of the crystals 162. In some embodiments, both the first width 314 and the second width 316 are less than the crystal width 318. Further, the cross-bars 320 may have a cross-bar width 322 that is less than the crystal width 318. Use of reflective portion widths that are less than crystal widths can improve ease of assembly and/or provide for increased light transmission between crystals in various embodiments. Variation of the width of the posts and/or cross-bars provides further flexibility in controlling the amount of light reflected and the amount of light transmitted for different portions of a crystal array.

As seen in FIGS. 3 and 4, the cross-bar 320 include end tabs 350 located on either side of the cross-bar 320 (e.g., located at lateral edges 324, 326 of the cross-bar 320). The end tabs 350 are configured to cooperate with exterior edges 327 of the crystal array 160 to align the open reflective insert 190 with the crystal array 160. Further, the use of end tabs 350 in various embodiments reduces or eliminates the need to use glue to secure a reflective insert in place. In various embodiments, the end tabs 350 provide self-aligning between crystals and reflective portions, allowing each reflective portion to be placed near to the middle of each crystal.

Figure 5:
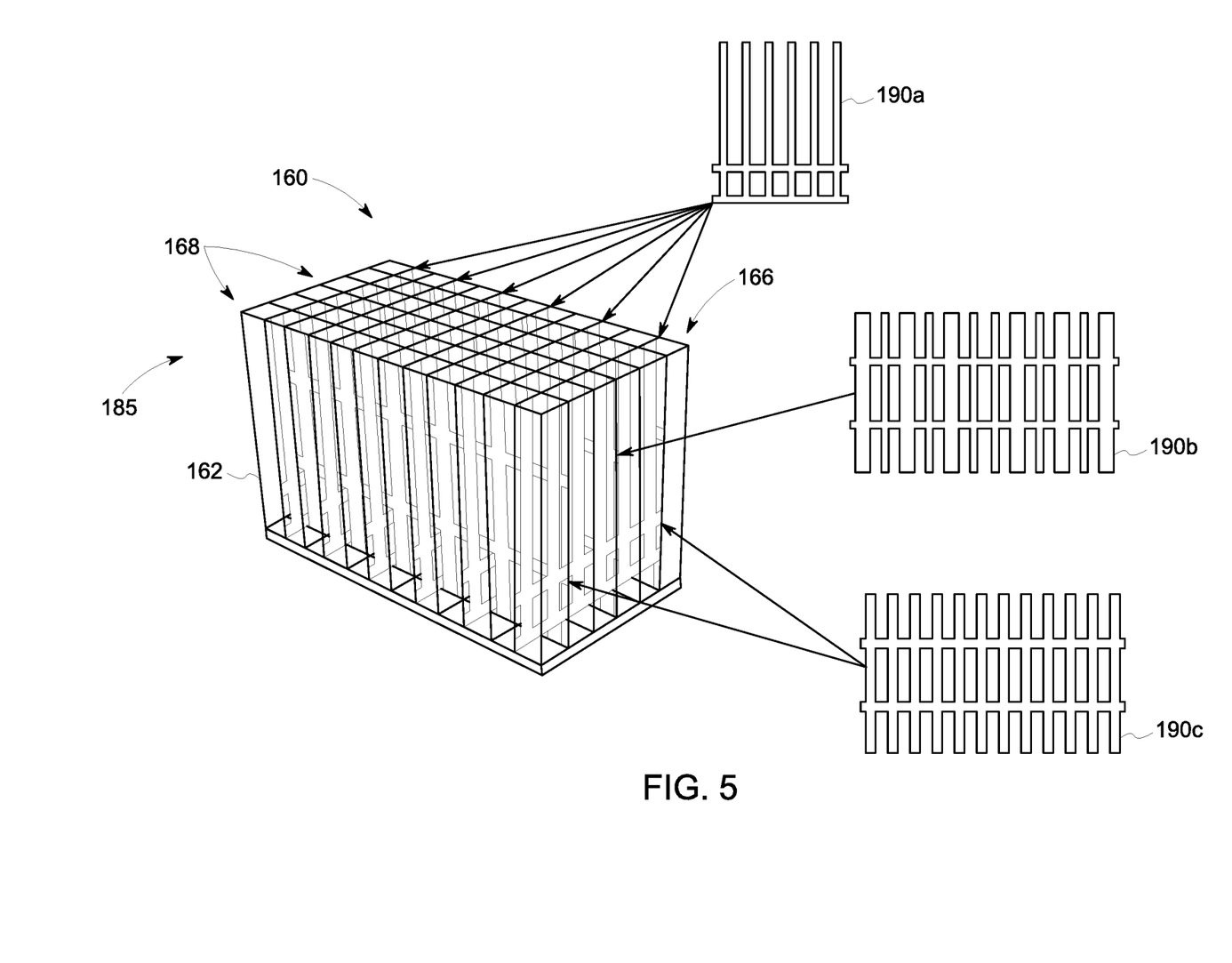
FIG. 5 provides a perspective view of an example scintillator crystal assembly including differently configured open reflective inserts in accordance with various embodiments.

Differently configured open reflective inserts 190 may be used in combination in various embodiments. For example, different amounts of light transmission or reflection may be desirable in different portions of a scintillator block. FIG. 5 provides a perspective view of an example scintillator crystal assembly 185 including differently configured open reflective inserts 190.

The example scintillator crystal assembly 185 of FIG. 5 includes an open reflective insert 190a, an open reflective insert 190b, and an open reflective insert 190c. In various embodiments, the open reflective inserts 190a, 190b, 190c may be generally similar and/or incorporate aspects of the open reflective insert 190 discussed in connection with FIGS. 3 and 4. In the illustrated example of FIG. 5, each of the reflective inserts 190a, 190b, 190c, has a height (29 millimeters in the illustrated example) corresponding to a height of the crystal array 160. The reflective insert 190a is configured to be disposed between corresponding adjacent horizontal rows 168 of the crystal array 160, and the reflective inserts 190b, 190c are configured to be disposed between respective corresponding adjacent vertical rows 166 of the crystal array 160. The single cross-bar of the reflective insert 190a is lower than the lower-most cross-bars of reflective inserts 190b, 190c, such that the scintillator crystal assembly 185 may be assembled by first placing reflective inserts 190a in place from the top of the scintillator crystal assembly 185, and then placing reflective inserts 190b, 190c in place from the top of the scintillator crystal assembly 185.

The depicted open reflective insert 190a has posts having a uniform width (1.5 millimeters in the illustrated example) that are uniformly spaced and joined by a single cross-bar. The depicted open reflective insert 190b has alternating posts of different width (2.5 millimeters and 1 millimeter in the illustrated example) that are uniformly spaced and joined by two cross-bars. The depicted open reflective insert 190c has posts having a uniform width (2 millimeters in the illustrated example) that are uniformly spaced and joined by a single cross-bar. The particular configurations are shown by way of example. It should be noted that other arrangements and/or sizes may be used in alternate embodiments. The particular configurations of individual open reflective inserts as well as combinations of open reflective inserts may be selected based on the particular requirements or goals of a particular application, for example to improve separation of peaks in a floodmap for a particular application to provide improved performance.

Returning to FIG. 1, the depicted processing unit 150 is configured to receive information (e.g., signals) from multiple detectors 110, and to use the information to reconstruct an image. For example, the processing unit 150 may be configured to use the signal recorded for each pixel of the photosensor 130 to reconstruct an image.

Generally, in various embodiments, the processing unit 150 (and/or any sub-unit or module of the processing unit 150) may be understood as a processing circuitry unit and may include a memory as well as processing circuitry such as one or more field programmable gate array (FPGA), application specific integrated circuit (ASIC), integrated circuit (IC), or microprocessor.

In the illustrated embodiment, the processing module 150 is configured to read and record the signal measured in each pixel of the photosensor 130 following an exposure to light provided by the scintillator block 120. For example, each pixel may be configured to provide an output voltage representative of the amount of energy impacting that particular pixel. The recorded signals for each pixel may be used to reconstruct an image.

Figure 6:
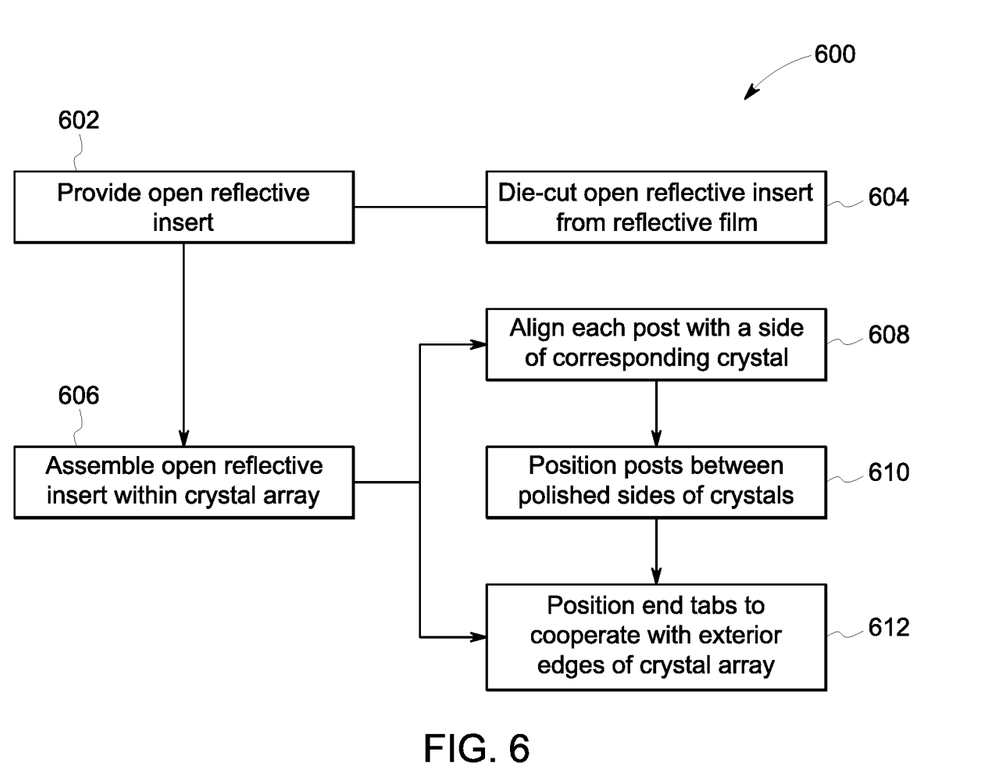
FIG. 6 is a flowchart of a method for forming a detector in accordance with various embodiments.

FIG. 6 provides a flowchart of a method 600 for forming a detector in accordance with various embodiments. The detector, for example, may be configured for use with a PET imaging system. In other embodiments, the detector may be configured for one or more other modalities of imaging additionally or alternatively. The method 600, for example, may employ, include, or related to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion.

At 602, an open reflective insert (e.g., open reflective insert 190) is provided. As discussed herein, the open reflective insert includes at least one reflective portion and at least one opening. The reflective portion defines an area, with the at least one opening positioned within the area. In the illustrated example, at 604, the open reflective insert is die-cut from a reflective film. It may be noted that multiple open reflective inserts may be provided in various embodiments.

At 606, the open reflective insert is assembled within a crystal array of plural crystals (e.g., crystals 162) to form a scintillator crystal assembly (e.g., scintillator crystal assembly 185, which may in turn be used to assemble imaging system 100). The open reflective insert is disposed between adjacent rows of crystal of the array. In some embodiments, the open reflective insert is disposed between polished sides of adjacent crystals. Again, it may be noted that more than one reflective insert may be utilized in various embodiments. (See, e.g., FIG. 5 and related discussion.)

In some embodiments, the open reflective insert includes spaced posts and at least one cross-bar as discussed herein. (See, e.g., FIGS. 3 and 4 and related discussion.) In the illustrated example, at 608, each post of the open reflective insert is aligned with a side of a corresponding crystal to control light shared between the corresponding crystal and crystal that is adjacent to the corresponding crystal. At 610 of the illustrated embodiment, the posts of the open reflective insert are positioned between polished sides of the crystals (i.e., immediately adjacent to polished sides).

As also discussed herein, in various embodiments, one or more cross-bars of an open reflective insert includes end tabs on either side of the cross-bar. In the illustrated example, at 612, the end tabs are positioned to cooperate with exterior edges of the crystal array to align the open reflective insert with the crystal array, and to help secure the open reflective insert in place in a desired position and/or orientation.

Figure 7:
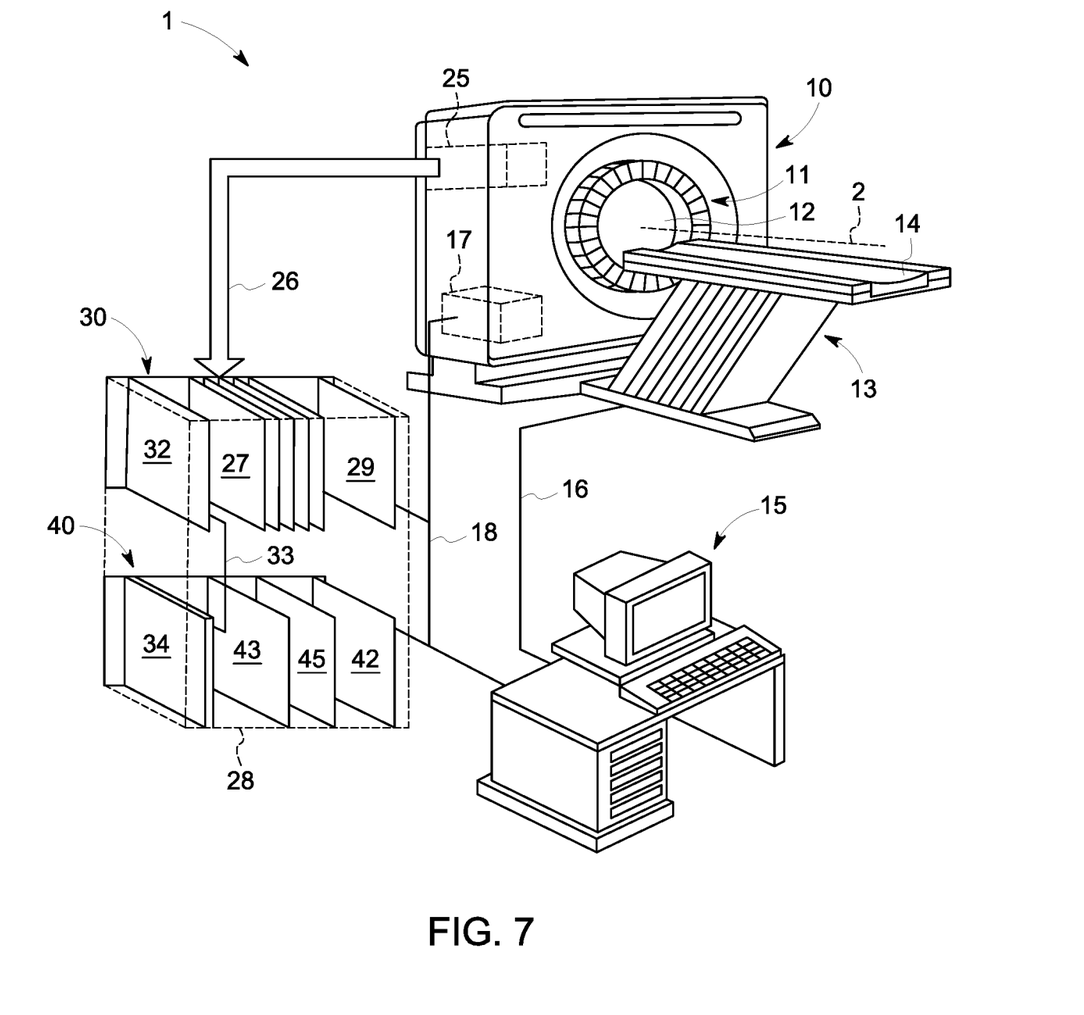
FIG. 7 illustrates an imaging system in accordance with various embodiments.
Figure 8:
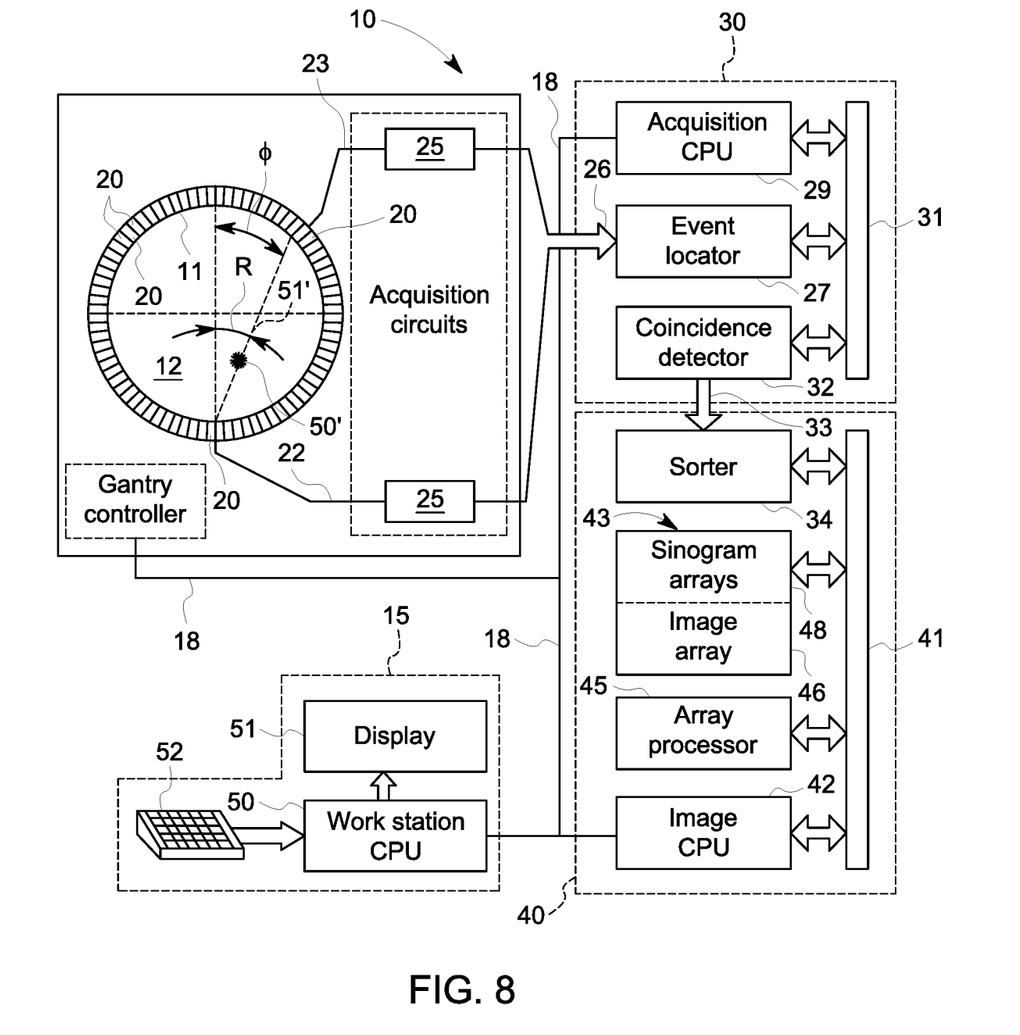
FIG. 8 is a schematic diagram of the imaging system of FIG. 7.

FIGS. 7 and 8 illustrate a PET imaging system with which various embodiments described herein may be employed. In other embodiments, crystal arrays as discussed herein may be utilized with other imaging systems (e.g., imaging systems configured for one or more additional or alternative modalities). FIG. 7 illustrates a PET scanning system 1 including a gantry 10 that supports a detector ring assembly 11 about a central opening or bore 12. The detector ring assembly 11 in the illustrated embodiments is generally circular and is made up of plural rings of detector 110 spaced along a central axis 2 to from a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 8, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

As shown in FIG. 8, a set of acquisition circuits 25 is mounted within the gantry 10 to receive the four signals from the detector block 20. The acquisition circuits 25 determine the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPT 29 which controls communications on the local area network 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 6 nanoseconds. As another example, the locations indicated by the two event data packets may be required to lie on a straight line which passes through the field of view (FOV) of in the scanner bore 12. Events which cannot be paired are discarded, but coincident event pairs are located and recorded as a coincidence data packet that is transmitted through a serial link 33 to a sorter 34. The format of the coincidence data packet may be, for example, a thirty-two bit data stream which includes, among other things, a pair of digital number that precisely identify the locations of the two detector crystals 21 that detected the event.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (θ) and pass through the scanner's field of view is a complete projection, or "view", which makes a set of sinogram. The distance (R) between a particular projection ray and the center of the field of view locates that projection ray within the view. As shown in FIG. 8, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then invers Fourier transformed, and each array element is back projected to form the image array 46. The image CPU 42 may either store the image array data or output the data to the operator work station 15.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A scintillator crystal assembly comprising:
a crystal array configured to receive rays emitted by an object to be imaged and to emit light energy responsive to the received rays, the crystal array comprising plural crystals arranged in rows, each crystal comprising:
a reception surface configured to receive the rays emitted by the object to be imaged;
an emission surface configured to emit the light energy responsive to the received rays; and
plural sides extending from the emission surface, wherein the sides are aligned with sides of adjacent crystals in the crystal array; and
a monolithic open reflective insert disposed between adjacent rows of the crystal array, the open reflective insert including at least one reflective portion and at least one opening, the at least one reflective portion defining an area and the at least one opening positioned within the area, wherein the open reflective insert includes spaced posts extending along a lateral dimension of the crystal array, each post aligned with a side of a corresponding crystal and configured to control light shared between the corresponding crystal and a crystal that is adjacent to the corresponding crystal, the open reflective insert including at least one cross-bar joining the posts and extending laterally across the crystal array, wherein the cross-bar comprises end tabs on either side of the cross-bar, the end tabs configured to cooperate with exterior edges of the crystal array to align the open reflective insert with the crystal array.

2. The scintillator crystal assembly of claim 1, wherein the open reflective insert comprises two cross-bars spaced from each other.

3. The scintillator crystal assembly of claim 1, wherein the plural sides of the crystals comprise roughened sides and polished sides, wherein the posts of the insert are interposed between polished sides.

4. The scintillator crystal assembly of claim 1, wherein at least some of the posts have a post width that is smaller than a crystal width of the crystals.

5. The scintillator crystal assembly of claim 1, wherein the posts of the gated reflective insert comprise a first group of posts having a first width and a second group of posts having a second width that is different from the first width.

6. The scintillator crystal assembly of claim 1, wherein the posts have a rectangular shape.

7. The scintillator crystal assembly of claim 1, wherein the open reflective insert comprises an enhanced specular reflector (ESR) film.

8. The scintillator crystal assembly of claim 1, wherein the emission surface is disposed opposite the reception surface.

9. A detector system for imaging an object comprising:
a scintillator block configured to receive rays from an object to be imaged and to emit light energy responsive to the received rays, the scintillator block including a scintillator crystal array configured to receive rays emitted by the object and to emit light energy responsive to the received rays, the scintillator crystal array comprising plural crystals, each crystal comprising:
a reception surface configured to receive the rays emitted by the object to be imaged;
an emission surface configured to emit the light energy responsive to the received rays; and
plural sides extending from the emission surface, wherein the sides are aligned with sides of adjacent crystals in the crystal array;
a monolithic open reflective insert disposed between adjacent rows of the crystal array, the open reflective insert including at least one reflective portion and at least one opening, the at least one reflective portion defining an area and the at least one opening positioned within the area, wherein the open reflective insert includes spaced posts extending along a lateral dimension of the crystal array, each post aligned with a side of a corresponding crystal and configured to control light shared between the corresponding crystal and a crystal that is adjacent to the corresponding crystal, the open reflective insert including at least one cross-bar joining the posts and extending laterally across the crystal array, wherein the cross-bar comprises end tabs on either side of the cross-bar, the end tabs configured to cooperate with exterior edges of the crystal array to align the open reflective insert with the crystal array; and
a photosensor configured to receive the light energy emitted from the scintillator crystal array.

10. The detector system of claim 9, wherein the plural sides of the crystals comprise roughened sides and polished sides, wherein the posts of the insert are interposed between polished sides.

11. The detector system of claim 9, wherein at least some of the posts have a post width that is smaller than a crystal width of the crystals.

12. A method for providing a scintillator for imaging an object, the method comprising:
providing a monolithic open reflective insert including at least one reflective portion and at least one opening, the at least one reflective portion defining an area and the at least one opening positioned within the area; and
assembling the open reflective insert within a crystal array with plural crystals to form a scintillator crystal assembly, wherein the open reflective insert is disposed between adjacent rows of crystals of the array;

wherein the open reflective insert includes spaced posts extending along a lateral dimension of the crystal array and at least one cross-bar joining the posts, wherein assembling the crystal array includes disposing each post aligned with a side of a corresponding crystal to control light shared between the corresponding crystal and a crystal that is adjacent to the corresponding crystal;

wherein the cross-bar comprises end tabs on either side of the cross-bar, wherein assembling the crystal array includes positioning the end tabs to cooperate with exterior edges of the crystal array to align the open reflective insert with the crystal array.

13. The method of claim 12, wherein providing the open reflective insert comprises die-cutting the open reflective insert from a reflective film.

14. The method of claim 12, wherein the plural sides of the crystals comprise roughened sides and polished sides, wherein assembling the crystal array includes positioning the posts of the open reflective insert between polished sides of the crystals.

* * * * *